(12) United States Patent
Reel

(10) Patent No.: US 8,267,471 B2
(45) Date of Patent: Sep. 18, 2012

(54) PASSIVE ENERGY ABSORBING SEAT

(75) Inventor: Travis M. Reel, Ridgeway, OH (US)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 12/546,208

(22) Filed: Aug. 24, 2009

(65) Prior Publication Data

US 2011/0043008 A1   Feb. 24, 2011

(51) Int. Cl.
*B60N 2/42* (2006.01)
(52) U.S. Cl. .............................. 297/216.13; 297/216.14
(58) Field of Classification Search ............. 297/216.13, 297/216.14
See application file for complete search history.

(56) References Cited

U.S. PATENT DOCUMENTS

| | | | | |
|---|---|---|---|---|
| 4,138,157 | A * | 2/1979 | Pickett et al. ................. | 297/472 |
| 5,054,845 | A * | 10/1991 | Vogel ........................ | 297/216.14 |
| 5,509,716 | A * | 4/1996 | Kolena et al. ............ | 297/216.13 |
| 5,669,661 | A * | 9/1997 | Pajon ........................ | 297/216.13 |
| 5,927,804 | A | 7/1999 | Cuevas | |
| 6,824,212 | B2 | 11/2004 | Malsch et al. | |
| 6,921,132 | B2 | 7/2005 | Fujita et al. | |
| 6,964,451 | B1 * | 11/2005 | Bergey ...................... | 297/216.13 |
| 7,284,794 | B2 | 10/2007 | Yamaguchi et al. | |
| 7,540,563 | B2 * | 6/2009 | Ogawa et al. ............ | 297/216.13 |
| 2008/0185884 | A1* | 8/2008 | Hansen ..................... | 297/216.13 |

\* cited by examiner

*Primary Examiner* — David Dunn
*Assistant Examiner* — Erika Garrett
(74) *Attorney, Agent, or Firm* — Rankin, Hill & Clark LLP

(57) ABSTRACT

A vehicle seat back includes a frame and back support member. The back support member can connect with the frame at a first location and at a second location. The back support member can include a breakaway connection configured to rupture during a crash event to increase an operative length of the back support member.

13 Claims, 3 Drawing Sheets

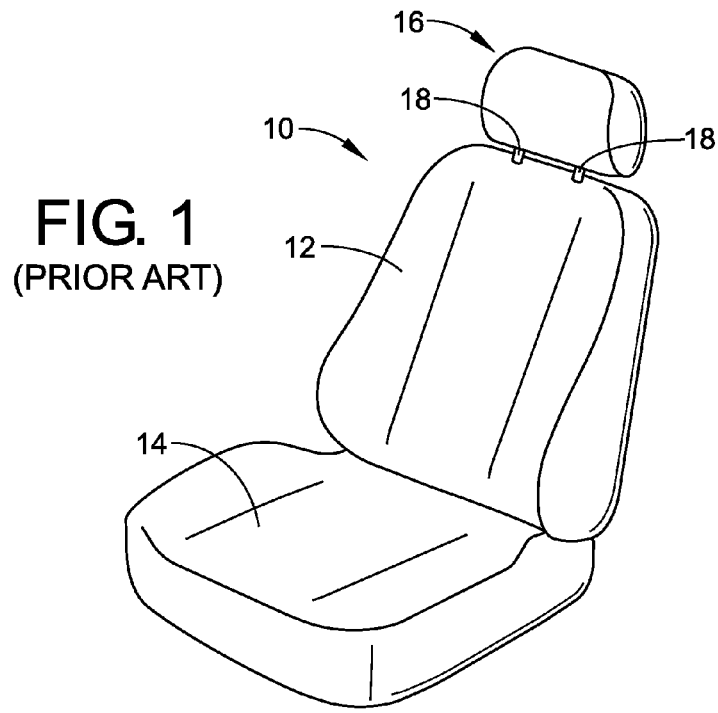
FIG. 1
(PRIOR ART)
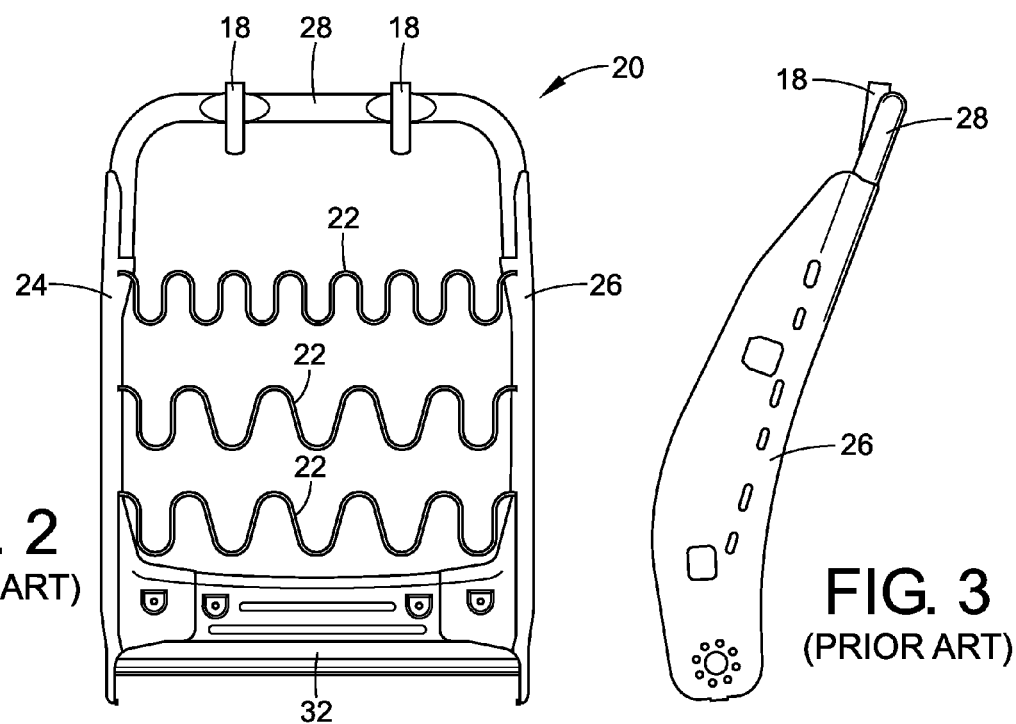
FIG. 2
(PRIOR ART)
FIG. 3
(PRIOR ART)

PASSIVE ENERGY ABSORBING SEAT

BACKGROUND

This disclosure is directed to a vehicle seat. More particularly, this disclosure is directed to a seat back for a vehicle seat.

With reference to FIG. 1, a typical vehicle seat 10 includes a seat back 12 and seat base 14. The vehicle seat 10 can also include a head rest 16 that is connected to the seat back 12 with stays 18. The vehicle seat back 12 can pivot towards the seat base 14 in a typical manner. As is conventional, the seat back 12, the seat base 14 and the head rest 16 can be covered with cushioning material (not visible) and an upholstered cover.

FIGS. 2 and 3 depict components found in the interior of the known seat back 12. The known seat back 12 includes a seat back frame 20 and a plurality of back support members 22 each connected with the seat back frame 20 and configured to support the back of a vehicle occupant when the vehicle occupant is seated on the vehicle seat 10 (FIG. 1). The seat back frame 20 includes a left side frame member 24 and a right side frame member 26. An upper frame member 28 interconnects respective upper ends of the left side frame member 24 and the right side frame member 26. A lower frame member 32 interconnects lower ends of the left side frame member 24 and the right side frame member 26. In the known embodiment depicted in FIG. 2, the back support members 22 are steel spring-like members that span from the left side frame member 24 to the right side frame member 26 and are bent in a serpentine manner. The back support members are configured to flex slightly when a vehicle occupant rests his or her back against the seat back 12 (FIG. 1).

It is known to incorporate a linkage system into a vehicle seat back so that during a crash event the head rest 16 (FIG. 1) can move forward. This movement of the head rest 16 is to reduce the likelihood of a neck injury. These known linkage systems typically include an actuator positioned generally in the middle of the vehicle seat back 12. This actuator is connected through a linkage to the head rest 16 so that when an occupant's back pushes against the actuator, the head rest 16 moves forward to restrain the occupant's neck. These current known systems include four bar linkages and cable systems, which are very complicated.

Another commercially available vehicle seat includes a weak seat that collapses during impact. This seat has been shown to reduce neck injuries by the seat back absorbing crash loads, however, the seat collapses and the byproduct seems to be a reduction in neck injuries.

SUMMARY

An example of a vehicle seat back that can overcome the aforementioned shortcomings includes a vehicle seat back frame and a back support member. The frame can include left and right side frame members. The back support member can connect with each side frame member and span from the left side frame member to the right side frame member. The back support member can include a breakaway connection configured to rupture during a crash event to increase an operative length of the back support member. The operative length of the back support member can be defined as the length of the back support member carrying a tensile load being applied by an associated occupant.

Another example of a vehicle seat back includes a frame and back support member. The back support member can connect with the frame at a first location and at a second location. The back support member can include a breakaway connection configured to rupture during a crash event to increase an operative length of the back support member. In this example, the operative length can also be defined as the length of the back support member carrying a tensile load being applied by an associated occupant.

An example of a vehicle seat back includes a seat back including a rigid frame and back support straps connected with the frame and configured to carry a tensile load being applied by the back of an associated occupant sitting on the vehicle seat. The vehicle seat also includes a breakaway connection associated with each back support strap. The breakaway connections are configured to rupture during a crash event to increase an operative length of the back support straps. The operative length can be defined as a length of the strap carrying the tensile load being applied by the back of an associated occupant sitting on the vehicle seat. The vehicle seat can also include a seat base connected with the seat back.

BRIEF DESCRIPTION OF THE DRAWINGS

FIG. 1 is a perspective view of a known vehicle seat.

FIG. 2 is a front elevation view of interior components of a known seat back for the vehicle seat shown in FIG. 1.

FIG. 3 is a side elevation view of the interior components shown in FIG. 2.

DETAILED DESCRIPTION

Figure 4:
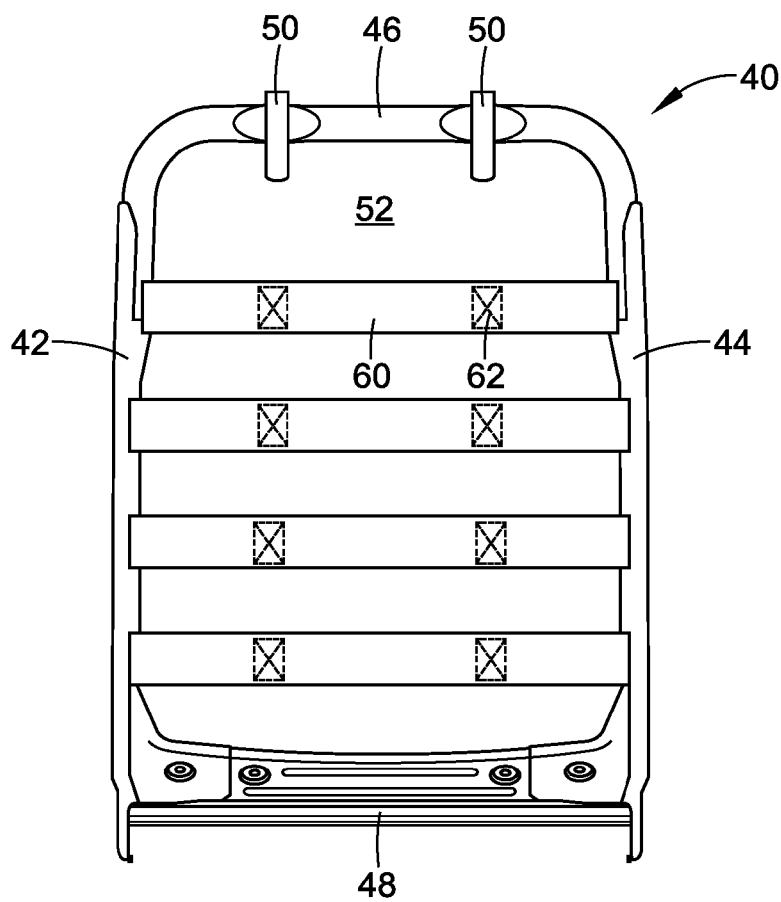
FIG. 4 is a front elevation view of interior components of a new seat back for a vehicle seat similar to the vehicle seat shown in FIG. 1.

With reference to FIG. 4, the interior components of a vehicle seat back, which from the exterior would look similar to the seat back 12 depicted in FIG. 1, are shown. The seat back connects with a seat base, similar to the seat base 14 shown in FIG. 1, to form a vehicle seat, similar to the vehicle seat 10 shown in FIG. 1. The example depicted in FIG. 4 includes a rigid seat back frame 40 including a left side frame member 42, a right side frame member 44, an upper frame member 46, and a lower frame member 48. Stays 50 for connecting a head rest (similar to the head rest 16 shown in FIG. 1) connect with the upper frame member 46 for attaching the head rest to the seat back frame 40.

Figure 5:
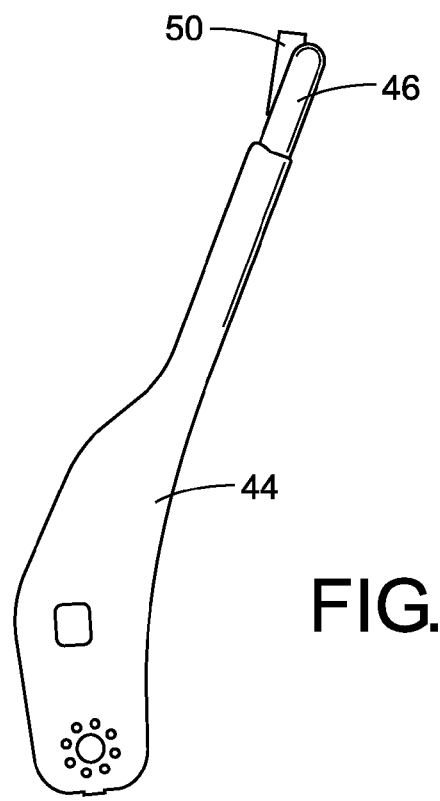
FIG. 5 is a side elevation view of the interior components shown in FIG. 4.

In the depicted embodiment, the left side frame member 42 and the right side frame member 44 are generally vertically oriented when the seat back is in the upright position. Each side frame member 42, 44 is made from stamped metal in the illustrated embodiment. The side frame members, however, can be made from other rigid materials, e.g. plastic or a rigid composite material. In the illustrated embodiment, the stiffness of the side frame members 42, 44 is reduced, as compared to the known side frame members 24 and 26 described above. This can be recognized by comparing FIG. 3 to FIG. 5. FIG. 5 depicts the right side frame member 44, and the left side frame member 42 is a mirror image thereof. The width (measured in the direction of travel of the vehicle) of the side frame members 42, 44 for the illustrated embodiment is less than the width of the known side frame members 24, 26 in the upper area of each side frame member.

The upper frame member 46 is located on the upper part of the vehicle seat back frame 40 and interconnects an upper end of the left side frame member 42 to an upper end of the right side frame member 44. The upper frame member 46 in the depicted embodiment is formed of a pipe that is generally U-shaped with its opposites ends welded to a respective side frame member 42 and 44. The lower frame member 48 is disposed on the lower part of the seat back frame 40 and interconnects a lower end of the left side frame member 42 to a lower end of the right side frame member 44. The lower frame member 48 in the depicted embodiment is made from a stamped metal and can be located near where the pelvis of the occupant would hit the seat back when seated in the vehicle seat such as the vehicle seat 10 shown in FIG. 1. The upper frame member 46 and lower frame member 48 are generally horizontally oriented when the seat back is in the upright position. The upper frame member 46 and the lower frame member 48 cross between the left side frame member 42 and the right side frame member 44 and thus can also be referred to as cross members.

The frame members 42, 44, 46 and 48 are interconnected to define an opening, or void, 52. As seen in FIG. 4, a plurality of back support members 60 connect with the frame member 40 and span the aforementioned opening 52 to support a vehicle occupant's back as the vehicle occupant is seated n the vehicle seat, for example a vehicle seat similar to vehicle seat 10 shown in FIG. 1.

In the embodiment depicted in FIG. 4, a plurality of back support members 60 connect with each side frame member 42, 44 and span from the left side frame member 42 to the right side frame member 44. The back support members 60 rigidly attach to the rigid frame 40, which allow the back support members to carry a tensile load being applied on the back support members by the back of an occupant sitting in the vehicle seat. The back support members 60 depicted n FIG. 4 are made from a webbing material, which can be similar to a conventional seat belt. Each back support member 60 can also be a strap that is capable of carrying a tensile load. The back support members 60 shown in the illustrated embodiments are straps or cables that are typically incapable of carrying a compressive load, although this is not required.

Each back support member 60 includes a breakaway connection 62 that is configured to rupture during a crash event. A breakaway connection 62 can also be associated with each back support member 60, which as described above can be a strap. The breakaway connections 62 allow for an operative length $L_o$ of the back support member 60 to increase during and/or after a crash event, e.g., a rear end collision. The operative length $L_o$ can be considered a length of the back support member 60 carrying a load, e.g. a tensile load, being applied by an associated occupant's back against the back support member when the occupant is seated on a vehicle seat (similar to the vehicle seat 10 described above).

In the depicted embodiment, the rupture strength of the back support member 60 at the breakaway connections 62 is less than the rupture strength of the material from which the back support member is made. Also, in the illustrated embodiment, the rupture strength of the back support member 60 at the breakaway connections 62 is also less than the rupture strength of the connection between the back support member 60 and the rigid frame 40. The rupture strength at the breakaway connections 62 is also great enough to withstand the force being applied to the breakaway connections by the occupant's back during normal operating conditions, e.g. no crash event.

The rupture strength of the breakaway connections 62, however, is also designed so that during a crash event the breakaway connections rupture because the force being applied by the occupant's back during the crash event exceeds the rupture strength at the breakaway connections. However, the material from which the back support member 60 is made is designed so that the back support member itself does not rupture during a crash event and the connection between the back support member and the rigid frame is also maintained. Accordingly, during and after the crash event, the occupant's back sinks further into the seat back 12 (FIG. 1) as compared to a normal driving condition, i.e. before the crash event, and the back support member 60, which is now lengthened, still carries a tensile load being applied by the occupant's back. This can result in the occupant experiencing lower crash accelerations.

Figure 6:
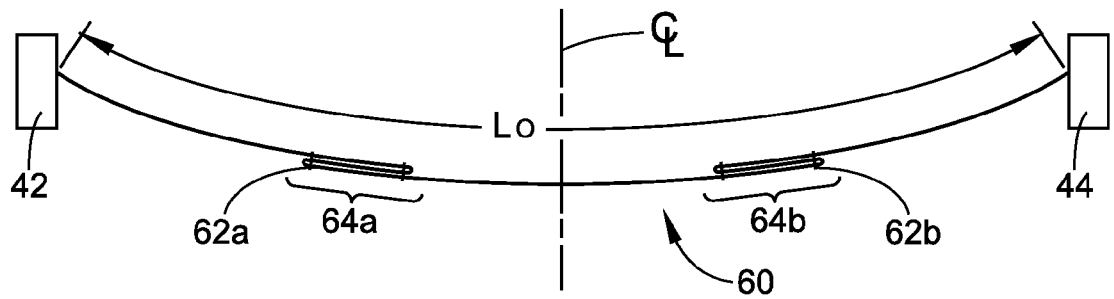
FIG. 6 is a schematic top plan view of a back support member of the vehicle seat back shown in FIG. 4 connected to the vehicle seat back frame and prior to a rupture at a breakaway connection.

For example, FIG. 6 depicts a back support member 60 spanning between the left side frame member 42 and the right side frame member 44 having two breakaway connections 62a and 62b. The operative length $L_o$ of the back support member 60 in FIG. 6, which is before the breakaway connections 62a and 62b have ruptured, is less than the operative length $L_o$ of the back support member 60 in FIG. 7, which depicts the back support member 60 after the breakaway connections 62a and 62b have ruptured. By increasing the operative length $L_o$ of the back support members 60 during and after the crash event, the occupant can sink further into the seat back during a crash event (for example when the vehicle is rear ended) as compared to a normal operating condition, e.g. when there is no crash event. Accordingly, the occupant of the seat is subjected to lower crash accelerations.

Figure 7:
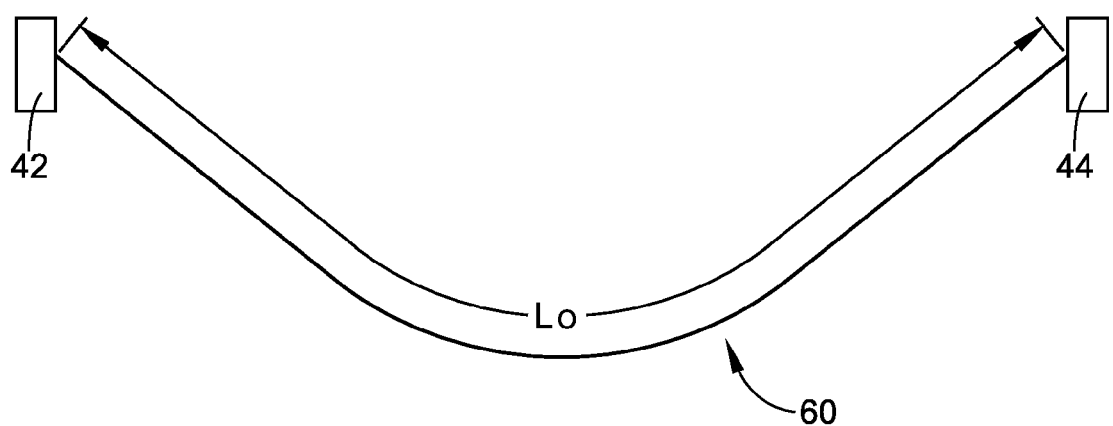
FIG. 7 is a schematic depiction similar to FIG. 6; however, after rupture of the breakaway connections.

As more clearly seen in FIG. 6, the operative length $L_o$ of the back support member 60 before the rupture of the breakaway connections 62a, 62b is shorter than the operative length $L_o$ of the back support member 60 after the rupture of the breakaway connections (shown in FIG. 7) because of folded-over sections 64a and 64b of the back support member 60. In the embodiment depicted, the back support member is a webbing material that is folded over at the folded-over sections 64a and 64b and stitched to itself at the respective breakaway connections 62a and 62b. FIGS. 6 and 7 depict the back support member 60 as a single piece of webbing material, which can be similar to a conventional seat belt, that spans from the left side member 42 to the right side member 44 where this single piece of material is stitched to itself to form the folded-over sections 64a and 64b that shorten the operative length $L_o$ of the back support member.

Instead of providing a stitched connection at each breakaway connection 62, the breakaway connection can be made via other types of connections, e.g. an adhesive connection, a hook and loop fastener connection, a welded connection or a riveted connection. These other types of connections can also be used with the folded over sections.

Figure 8:
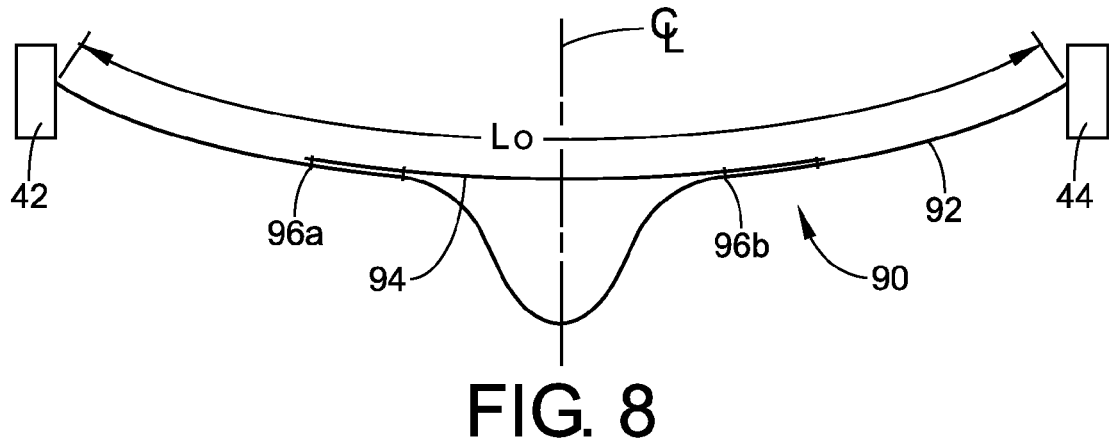
FIG. 8 is a schematic top plan view similar to FIG. 6, however showing an alternative embodiment of a back support member.

Instead of providing a single piece of material for each sack support member, more than one element or piece of material can be provided. For example, FIG. 8 depicts a back support member 90 including at least two pieces of material or two straps: a first piece of material, or strap, 92 and a second piece of material, or strap, 94. The first strap 92 connects with and spans from the left side frame member 42 to the right side frame member 44. The first strap 92 also connects to the second strap 94 at breakaway connections 96a and 96b. For the embodiment depicted in FIG. 8 the operative length $L_o$ is the length of the back support member 90 that carries the tensile load being applied by the occupant's back. In the embodiment illustrated in FIG. 8, during normal operating conditions i.e. no crash event) the operative length $L_o$ is the length of the first strap 92 located between the left side frame member 42 and the first breakaway connection 96a, and the length of the second strap 94 between the first breakaway connection 96a and the second breakaway connection 96b, and the length of the length of the first strap 92 between the second breakaway connection 96b and the right side frame member 44.

When the tensile load being applied to the back support member 90 exceeds the rupture strength of the breakaway connections 96a, 96b, the breakaway connections rupture. This results in the second strap 94 disconnecting from the first strap 92 so that the operative length $L_o$ of the back support member, i.e. the length of the back support member that carries the tensile load being applied by the occupant's back, increases (to a configuration similar to that shown in FIG. 7) so that the occupant can sink further into the seat back.

FIG. 6 depicts the back support member 60 having two breakaway connections 62a and 62b, and FIG. 8 depicts the back support member 90 including two breakaway connections 96a and 96b. A fewer or greater number of breakaway connections can be provided with each back support member. With reference to FIG. 6, the first breakaway connection 62a is equidistant between the left side frame member 42 and a centerline $\mathcal{Q}$ and the second breakaway connection 62b is equidistant between the right side frame member 44 and the centerline. In the embodiment illustrated in FIG. 8, the first breakaway connection 96a is between the left side frame member 42 and a centerline $\mathcal{Q}$ and the second breakaway connection 96b is between the right side frame member 44 and the centerline. The breakaway connections, however, can be located elsewhere.

The back support members 60 and 90 are depicted as generally horizontally oriented. The back support members 60 (FIG. 4) and 90 (FIG. 8) can take other orientations, e.g. a vertical orientation or a diagonal orientation. With reference back to FIG. 4, for example, if the back support members 60 were to take an orientation other than horizontal, the back support member 60 can attach to the frame 40 at a first location, e.g. on the left side member 42, however the back support member can attach to the frame 40 at a second location, which might be located on one of the cross members, e.g., upper frame member 46 or lower frame member 48. Where the back support members are vertically oriented, the back support members can span the void 52 defined by the frame 40 and can attach to the upper frame member 46 at a first location and to the lower frame member 48 at a second location, respectively. The breakaway connection(s) 62 are located on the back support member 60 between the first location and the second location.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat back comprising:
a rigid frame;
a first back support member connected with the frame at a first location and at a second location, the first back support member being formed of a single piece of material and including a forward facing surface and a rearward facing surface; and
a second back support member connected to the forward facing surface of the first back support member at first and second breakaway connections, respectively, on the first back support member between the first location and the second location, the second back support member including a forward facing surface and a rearward facing surface, the forward facing surface of the first back support member and the forward facing surface of the second back support member together defining a substantially continuous support surface spanning between the first location and the second location of the frame, each breakaway connection being configured to rupture during a crash event to increase an operative length of the first back support member, the operative length being a length of the first back support member carrying a tensile load being applied by an associated occupant of a vehicle seat that includes the vehicle seat back.

2. The vehicle seat back of claim 1, wherein each back support member is generally horizontally oriented.

3. The vehicle seat back of claim 1, wherein the frame includes a left side frame member, a right side frame member and a cross member connected with the left side frame member and the right side frame member, and the frame generally defines a void between the left side frame member and the right side frame member.

4. The vehicle seat back of claim 3, wherein the first back support member spans the void and the first location is on the left side frame member and the second location is on the right side frame member.

5. The vehicle seat back of claim 1, wherein each back support member is a strap.

6. The vehicle seat back of claim 5, wherein each breakaway connection includes a stitched connection, an adhesive connection, a hook and loop fastener connection, a welded connection or a riveted connection.

7. A vehicle seat back comprising:
a rigid frame;
a first back support member connected with the frame at a first location and at a second location, the first back support member including a forward facing surface and a rearward facing surface; and
a second back support member including a forward facing surface and a rearward facing surface, the rearward facing surface of the second back support being connected to the forward facing surface of the first back support member at first and second breakaway connections, respectively, on the first back support member between the first location and the second location, each breakaway connection being configured to rupture during a crash event to increase an operative length of the first back support member, the operative length being a length of the first back support member carrying a tensile load being applied by an associated occupant of a vehicle seat that includes the vehicle seat back.

8. The vehicle seat back of claim 7, wherein the forward facing surface of the first back support member and the forward facing surface of the second back support member together defining a substantially continuous support surface spanning between the first location and the second location of the frame.

9. The vehicle seat back of claim 7, wherein the first back support member is formed of a single piece of material having an actual length greater than the operative length of the first back support member.

10. The vehicle seat back of claim 7, wherein the first back support member includes a single bight flanked by the first and second breakaway connections.

11. The vehicle seat back of claim 7, wherein the first back support member includes a single fold which allows the operative length to increase during a crash event.

12. A vehicle seat back comprising:
   a rigid frame;
   a first back support member connected with the frame at a first location and at a second location; and
   a second back support member connected to the first back support member at first and second breakaway connections, respectively, on the first back support member between the first location and the second location, the first back support member together with the second back support member defining a substantially continuous forward facing support surface spanning between the first location and the second location of the frame, wherein the first back support member includes a single fold flanked by the first and second breakaway connections, each breakaway connection being configured to rupture during a crash event to increase an operative length of the first back support member, the operative length being a length of the first back support member carrying a tensile load being applied by an associated occupant of a vehicle seat that includes the vehicle seat back.

13. The vehicle seat back of claim 12, wherein the first back support member includes a forward facing surface and a rearward facing surface, and the second back support member includes a forward facing surface and a rearward facing surface, the rearward facing surface of the second back support being connected to the forward facing surface of the first back support member.

* * * * *